United States Patent
Beverly, IV

(10) Patent No.: US 6,732,182 B1
(45) Date of Patent: May 4, 2004

(54) METHOD FOR GENERATING PACKET LOSS REPORT BY A DATA COORDINATOR IN A MULTICAST DATA TRANSMISSION NETWORK UTILIZING A GROUP SHORTEST PATH TREE

(75) Inventor: Robert E. Beverly, IV, Marietta, GA (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/572,670

(22) Filed: May 17, 2000

(51) Int. Cl.[7] .............................................. G06F 15/16
(52) U.S. Cl. ...................... 709/230; 709/204; 709/223; 709/224; 709/232; 709/238; 370/244; 370/255; 370/256; 370/408; 370/413; 714/4
(58) Field of Search ................................. 709/223, 224, 709/204, 238, 230, 232; 370/244, 255, 413, 408, 256, 401; 714/4

(56) References Cited

U.S. PATENT DOCUMENTS

| | | | | |
|---|---|---|---|---|
| 5,331,637 | A | * | 7/1994 | Francis et al. ............... 370/408 |
| 5,602,841 | A | * | 2/1997 | Lebizay et al. ............. 370/413 |
| 5,903,559 | A | * | 5/1999 | Acharya et al. ............. 370/355 |
| 5,946,316 | A | * | 8/1999 | Chen et al. .................. 370/408 |
| 6,006,267 | A | | 12/1999 | Nguyen et al. |
| 6,058,113 | A | * | 5/2000 | Chang ......................... 370/390 |
| 6,088,732 | A | | 7/2000 | Smith et al. |
| 6,151,696 | A | | 11/2000 | Miller et al. |
| 6,154,463 | A | * | 11/2000 | Aggarwal et al. ........... 370/408 |
| 6,182,109 | B1 | | 1/2001 | Sharma et al. |
| 6,259,701 | B1 | * | 7/2001 | Shur et al. ................... 370/401 |
| 6,331,983 | B1 | * | 12/2001 | Haggerty et al. ............ 370/400 |
| 6,353,596 | B1 | * | 3/2002 | Grossglauser et al. ....... 370/256 |
| 6,415,330 | B1 | * | 7/2002 | Okanoue ..................... 709/245 |
| 6,434,626 | B1 | * | 8/2002 | Prakash et al. .............. 709/238 |
| 6,483,832 | B1 | * | 11/2002 | Civanlar et al. ............. 370/390 |
| 6,515,967 | B1 | * | 2/2003 | Wei et al. .................... 370/244 |
| 6,557,111 | B1 | * | 4/2003 | Theimer et al. ................ 714/4 |
| 2001/0034793 | A1 | * | 10/2001 | Madruga et al. ............ 709/238 |

OTHER PUBLICATIONS

Internet group management protocol, version 2, RFC 2236, Nov. 1997.*
Protocol Independent Multicast–Sparse Mode (PIM–SM), RFC 2362, Jun. 1998.*

(List continued on next page.)

*Primary Examiner*—Nabil El-Hady

(57) ABSTRACT

A method and apparatus to measure multicast performance over a network is described. A data coordinator coordinated a multicast protocol test between a data sender and a plurality of data receivers. A first shortest path tree is created from an intermediate device to the plurality of data receivers. A second shortest path tree is created from the intermediate device to the data sender. A group shortest path tree is formed including the first shortest path tree and the second shortest path tree to support transmission of test packets from the data sender to the data receivers. The data coordinator receives a test report from each of the data receivers. The data coordinator prepares a loss report using the test reports.

31 Claims, 18 Drawing Sheets

OTHER PUBLICATIONS

Apisdorf et al. "OC3MON: Flexible, Affordable, High–Performance Statistics Collection," Proceedings of INET '97, Kuala Lumpur, Malaysia, Jun. 1997.

Cacers et al., "Multicast–Based Inference of Network–Internal Loss Characteristics." Comp. Sci. Tech. Rep. 98–17, University of Massachusetts at Amherst, Feb. 1998, ftp;//gaia.cs.umass.edu/pub/CDHT98:MINC.ps.7.

Miller et al., "Performance Measurement on the vBNS," In Proceedings of the *Networld+Interop Engineers Conference '98*. Las Vegas. NV, May 1998.

Almeroth, Kevin C., "The Evolution of Multicast: From the MBone to Inter–Domain Multicast to Internet2 Deployment," Dept. of Computer Sci., Univ. of California, Santa Barbara; Oct., 1999, pp. 1–25.

Ca'ceres, Ramon et al., "Interferring Link–Level Performance from End–to–End Multicast Measurements," Apr., 1999, pp. 1–10.

Claffy, K. et al., "The Nature of the Beast: Recent Traffic Measurements From an Internet Backbone," Apr., 1998 (website address) http://www.caida.org/outreach/papers/Inet98/.

Meyer, D. et al., "GLop Addressing in 233/8," Feb., 2000, pp. 1–5, (website address) ftp://ftp.isi.edu/in–notes/rfc2770.txt.

Thompson, Kevin et al., Wide–Area Internet Traffic Patterns and Characteristics (Extended Version); Abridged Version of Paper appears in IEEE Network, Nov./Dec., 1997.

* cited by examiner

METHOD FOR GENERATING PACKET LOSS REPORT BY A DATA COORDINATOR IN A MULTICAST DATA TRANSMISSION NETWORK UTILIZING A GROUP SHORTEST PATH TREE

FIELD OF THE INVENTION

The invention relates to communications in general. More particularly, the invention relates to a method and apparatus for measuring multicast performance over a network, such as a high performance Internet Protocol backbone network.

BACKGROUND OF THE INVENTION

The services available over communication networks in general, and the Internet in particular, are growing at an exponential rate. It seems that every day a new application is introduced that makes it more convenient to transact business or enhance the accessibility of information to the individual user. As these services and applications develop, however, an increasing pressure is exerted on the limited resources of conventional networks such as the Internet. Bandwidth and scalability become limiting factors to the introduction and delivery of these new services. Consequently, communications technologies are continually evolving in response to these constraints.

High performance networks are currently in development and directly address this demand. For example, a high-speed research and education network is currently under development by a group co-sponsored by the United States National Science Foundation (NSF) and MCI WorldCom. This network is referred to as the very high speed Backbone Network Service (vBNS). The vBNS network was chartered in 1995 to serve as a proving ground for new technologies, to support the development of advanced services, and to support the research conducted by its user community. Currently, the vBNS is implemented as an IP-over-ATM network, that is, its Network Layer (Layer 3 of the Open Systems Interconnection reference model promulgated by the International Organization for Standardization) runs the Internet Protocol (IP) on top of the Asynchronous Transfer Mode (ATM) protocol. Those protocols, in turn, run on a Synchronous Optical Network (Sonet) 622 Megabits per second (Mbps) infrastructure.

One advanced network service that is currently being tested for deployment over the vBNS is the IP multicast delivery service (the "multicast protocol" or "IP multicast"). The multicast protocol service at the IP layer enables a data source to use a group address to send an IP datagram to a set of receiving end-systems. The service, provided by the network, delivers the packet to all members of the group. In this manner, the network is responsible for intelligently replicating a packet such that all intended receivers receive the packet. By way of contrast, the traditional unicast service model has a single end-system send a packet to exactly one receiving end-system.

The implementation and refinement of the multicast protocol over the vBNS network is highly desirable for a number of reasons. The vBNS maintains a native IP multicast service, meaning the network is capable of routing and delivering IP multicast packets without tunneling. This removes the need for dedicated multicast routers and their attendant inefficiencies. The vBNS uses a protocol-independent multicast (PIM) dense-mode configuration among all vBNS routers. Distance vector multicast routing protocol (DVMRP) unicast routing is used, allowing the vBNS to support delivery of multicast backbone (Mbone) traffic. The Mbone is an experimental network that is built, using tunnels, over the commodity Internet. Potential multicast applications include communication between World Wide Web (WWW) caches, videoconferencing, MBone sessions, and updates from personal computer (PC) based traffic-measuring devices used to monitor network performance (e.g., "OC12MON" discussed later).

One problem associated with deployment of IP multicast over a high speed network such as vBNS is the absence of a robust measurement tool to assist in the deployment of the multicast protocol. Current testing protocols focus on measuring performance of the IP unicast protocol. Conventional unicast performance measurement protocols, however, do not translate well for use with measuring multicast performance, including loss packet rate and data rate. For example, conventional unicast performance measuring protocols implemented on the vBNS are typically based on carefully timed "cron" jobs. In other words, if a network comprises ten network nodes, each node will begin executing a test run of packets at a predetermined time in sequence. Thus, node 1 may be instructed to send one hundred thousand packets to node 2 at a predetermined time. Node 2 will count the number of packets received from node 1 and at what rate (e.g., 90,000 received at 4.98 megabits per second (Mbps)). By way of contrast, multicast testing requires a single node sending the same information to multiple receiving nodes. This type of testing requires more coordination than the simple one to one transfer of information. In another example, conventional testing protocols are limited in terms of the type of information measured. The conventional testing protocols fail to gather any information regarding the loss pattern of the packets not received or received out of sequence. Furthermore, since there is only one data sender and multiple data receivers, there exists a need for compiling the loss patterns across multiple receivers to compare performance and help identify potential loss conditions.

In view of the foregoing, it can be appreciated that a substantial need exists for a method and apparatus for measuring multicast performance over a network that solves the above-discussed problems.

SUMMARY OF THE INVENTION

One embodiment of the invention comprises a method and apparatus to measure multicast performance over a network. A data coordinator coordinates a multicast protocol test between a data sender and a plurality of data receivers. The dalta coordinator receives a test report from each of the data receivers. The data coordinator prepares a loss report using the test reports.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The embodiments of the invention comprise a method and apparatus to measure multicast performance over an IP network, such as the vBNS network. In one embodiment of the invention, ATM workstations are attached to the vBNS network at speeds of 622 Mbps (OC-12c). The ATM workstations operate as either multicast senders or receivers distributed throughout the vBNS backbone to communicate synthetic IP multicast traffic. One of the ATM workstations is configured to coordinate the multicast protocol test and to receive test reports. The coordinating workstation utilizes the test reports to measure performance of the multicast protocol. Performance is evaluated, for example, using packet loss results as a function of time and as a function of router hop count. These loss measurements are then correlated to the multicast distribution tree.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
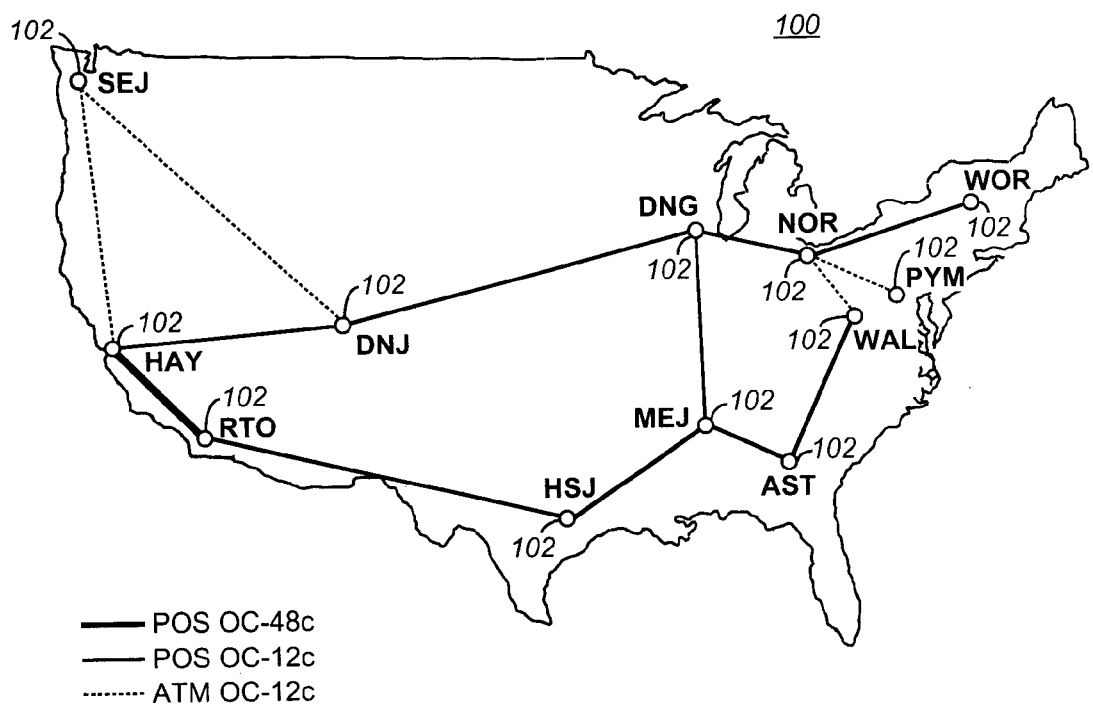
FIG. 1 a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a vBNS network 100. The vBNS network 100 is a representative high-performance IP backbone that spans the continental United States. Network 100 provides high-speed interconnections among various network nodes 102 (labeled as SEJ, HAY, RTO, DNJ, HSJ, MEJ, DNG, NOR, WOR, PYM, WAE and AST). Examples of network nodes 102 include high-performance computers located at Supercomputer Centers (SCC), universities, research and education institutions, and other research networks in the United States and abroad. Network nodes 102 are connected to the vBNS backbone at speeds ranging from 45 Mbps (DS-3) up to 622 Mbps (OC-12c) and most typically at 155 Mbps (OC-3c). The wide-area trunks between pairs of network nodes 102 consist of a mixture of ATM and packet-over-SONET (POS) circuits.

At this point, it may be helpful to provide some general information regarding the evolution and architecture of the vBNS network and the IP multicast protocol. The vBNS has offered a multicast service since its inception in 1995. Originally this offering consisted of DVMRP tunnels between vBNS-owned Digital Equipment Corporation (DEC) Alpha hosts located at five vBNS-connected supercomputer sites. In 1996, the DVMRP tunnels to customer sites were rehomed to vBNS Cisco 7500 series routers. In turn, these Cisco routers, which at the time were the vBNS core routers, began running native IP multicast internally via PIM dense mode. All vBNS routers were connected in a full mesh of point-to-point ATM Permanent Virtual Circuits (PVCs), making the introduction of PIM dense mode a relatively straightforward process. Multicast routing, however, was less straightforward. DVMRP route exchanges took place among the vBNS routers to best support the DVMRP-based multicast infrastructures at the connected institutions. In this configuration, problems with DVMRP route convergence and router implementation bugs plagued the network until DVMRP route exchanges were replaced with Multicast Broader Gateway Protocol (MBGP) routing in 1997. By this time the number of institutions and other research networks connected to the vBNS had grown considerably and about half of these networks were multicast-connected. MBGP stabilized multicast routing on the vBNS backbone, but most institutions could not upgrade so quickly to MBGP-capable router code, requiring route redistribution between MBGP and DVMRP at the vBNS routers on the edges.

The flood-and-prune nature of PIM dense mode did not adversely impact the vBNS routers and backbone performance until late 1998, when a peak in multicast usage culminating in multicast demonstrations at Internet2 meetings exceeded the PIM processing and multicast packet forwarding limits of the routers. The vBNS routers were subsequently upgraded and reconfigured to run PIM sparse-mode in the backbone. The vBNS was one of the early adopters of the Multicast Source Distribution Protocol (MSDP) in 1999 to support interdomain multicast routing among PIM sparse-mode domains.

Currently, the vBNS network supports a variety of multicast connectivity with a flexible and reliable multi-vendor network configuration. Full MBGP-peering among the core vBNS Juniper M40 routers ensures shortest-path distribution trees across the vBNS backbone. To support institutions and research networks running DVMRP or PIM dense-mode, vBNS Cisco 7507 routers offer DVMRP tunnels, PIM tunnels, and direct PIM-DM connections in combination with DVMRP or MBGP route exchange and proxy-registering to handle the boundary between dense and sparse modes. MSDP peering is enabled on both Cisco and Juniper routers and the MSDP configuration is changing to support an "anycast MSDP/RP" functionality to distribute the MSDP peer and rendezvous point functions.

As mentioned previously, performance monitoring and analysis is central to managing and planning the growth of the vBNS network. Consequently, one of the distinguishing features of the vBNS network is its extensive measurement infrastructure. The vBNS backbone is highly instrumented to facilitate both active and passive traffic measurements. Active measurements of both throughput and round-trip times are supported by the unix workstations located in each vBNS point of presence. Automated scripts conduct throughput measurements nightly on both directions of each vBNS backbone trunk between city pairs. The throughput performance tests consist of both congestion-controlled Transport Control Protocol (TCP) traffic streams and unthrottled, unicast User Datagram Protocol (UDP) streams. The Sun hosts also support round-trip time tests via automated ping scripts that execute every 20 minutes on a continuous basis. Each Sun host pings every other host in the network and produces a table of the round-trip time results.

Passive traffic measurement on the vBNS is supported by a traffic monitoring platform referred to as OCxMON (e.g., OC12MON and OC48MON). The OCxMON monitors, which are capable of capturing OC12-rate traffic traces as well as performing real-time traffic analysis, are deployed at every vBNS POP. The monitor is a PC platform with multiple OC12 ATM Network Interface Cards (NICs) running MS-DOS and custom firmware and software. It operates by monitoring signals from an optical splitter that is installed on an optical fiber pair in a vBNS POP. The OCxMON is highly configurable and allows the user to choose what specific traffic data is captured, from full packet traces, to distilled reports that are generated by summarizing the traffic as it is observed in real time. The real-time summaries typically consist of "flows-based" statistics, which detail characteristics of the traffic in terms of protocol distribution, byte volumes, packet volumes, packet sizes, etc.

The multicast measurement system described herein is an improvement over the active unicast performance measurements described above. One goal was to extend the performance measurement capability into the multicast realm to provide statistics on the performance of the multicast backbone. The same Sun hosts used for the round-trip time and unicast throughput measurements serve as the platform for the multicast measurements. The tests are implemented through custom-developed software and a coordination protocol that orchestrates the tests by configuring the sender and receivers for each test.

Implementing tests via carefully "cron" jobs is neither practical nor tractable for distributed multicast tests. Instead a centralized approach is adopted, that utilizes a protocol to coordinate the participating hosts. A multicast receiving and transmitting application was custom-coded to send or receive multicast datagrams on the Sun ATM NIC based on a series of out-of-band instructions. "Out-of-band" in this context refers to the control messages being sent separately from the test traffic and carried over a reliable protocol, namely TCP. It was one design goal for the system to permit maximum flexibility and allow a particular test run to support any arbitrary number of receivers to receive traffic from an arbitrary group at any data rate and packet size.

Figure 2:
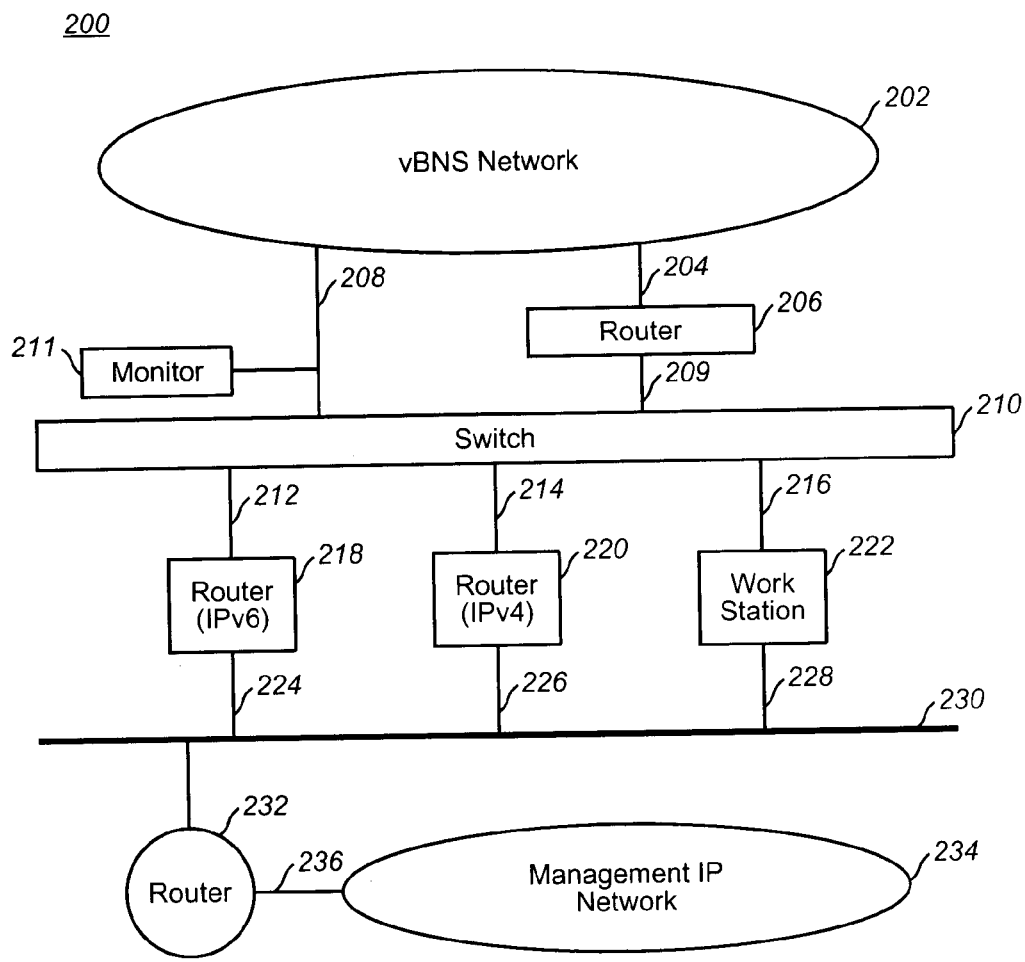
FIG. 2 is a block diagram of a vBNS network node in accordance with one embodiment of the invention.

FIG. 2 is a block diagram of a vBNS network node in accordance with one embodiment of the invention. FIG. 2 illustrates a network node 200 including a vBNS backbone network 202 connected to a router 206 over a line 204. Router 206 is connected to a switch 210 over a line 209. Network 202 is also connected to switch 210 over a line 208. A monitor 211 is connected to line 208. Switch 210 is connected to a router 218, a router 220 and a workstation 222 via lines 212, 214 and 216, respectively. Router 218, router 220 and workstation 222 are each connected to a management Ethernet network 230 via lines 224, 226 and 228, respectively. Network 230 is connected to a router 232 and a management IP network 234 via a line 236.

In one embodiment of the invention, router 206 directly drives the wide-area trunks in the case of the POS trunks, whether they are OC-12c or OC-48c capacity. An example of router 206 is a Juniper M40 router. An example of switch 210 is an ATM switch such as the Marconi ASX-1000 ATM switch. The wide-area ATM trunks are accessed through switch 210. Line 204 connecting router 206 to network 202 operates at OC-48c speeds. Line 209 connecting router 206 to switch 210 comprises dual OC-12c ATM. Line 208 connecting switch 210 to network 202 operates at OC-12c speeds as well. Line 208 also has monitor 211 attached to it. An example of monitor 211 includes an OC12MON as discussed above. Monitor 211 is programmed to track active flows on a real-time basis on the OC-12c access trunks bi-directionally.

Also attached to switch 210 in each network node 200 is a router 218, a router 220 and a workstation 222. Router 218 routes IP version 6 traffic (IPv6) between switch 210 and management Ethernet network 230. An example of router 218 includes the Cisco 4700 router. Router 220 routes IP version 4 traffic (IPv4) between switch 210 and anagement Ethernet network 230. An example of router 220 includes the Cisco 7507 outer.

Attached to network 230 is router 232. Router 232 routes traffic between management Ethernet network 230 and management IP network 234.

As performance monitoring and analysis is central to managing and planning the growth of the vBNS network, dedicated hardware has been deployed to support this function. Consequently, each network node 200 includes a workstation 222 deployed as a platform for measuring and analyzing the performance of the vBNS. An example for workstation 222 includes an Ultra-2 workstation made by Sun equipped with a Sun OC-12c ATM adapter. In this embodiment of the invention, workstation 222 is configured with a Unspecified Bit Rate (UBR) ATM PVC to its co-located router 206. Workstation 222 is conventionally used to perform automated performance tests (for unicast performance) run on each backbone trunk of the vBNS between, for example, pairs of Sun Ultra-2s.

Workstation 222 is modified as described herein to implement the multicast testing protocol in accordance with one embodiment of the invention. Workstation 222 originates and receives data communicated over network 202. This includes communicating test data used for measuring performance of the multicast protocol as implemented by network node 200 over network 202. Traffic from one workstation 222 is directed to a local router, and is routed across the backbone wide-area POS and/or ATM trunks, to another workstation 222 located at another network node 102 (e.g., between workstations located at SEJ and WOR). Workstation 222 is also configured to perform the operations of a data coordinator, as desired. It can be appreciated that although a workstation 222 can be configured as a data sender, a data receiver or a data coordinator, the workstation 222 typically operates to perform only one such function at any particular time.

Figure 3:
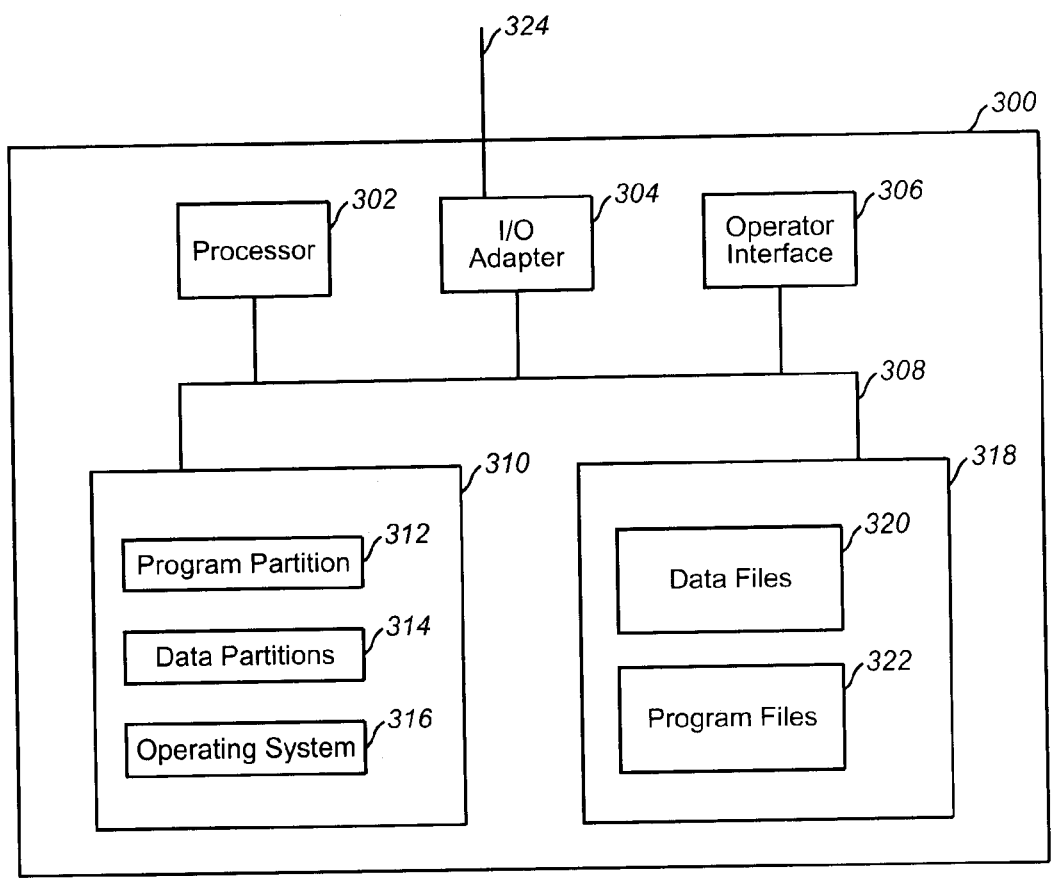
FIG. 3 is a block diagram of a computer system which is representative of a workstation in accordance with one embodiment of the invention.

FIG. 3 is a block diagram of a computer system 300 which is representative of a workstation in accordance with one embodiment of the invention. Each of these blocks comprises at least one such computer system. Although only one each of computer system 300 are shown in FIG. 3, it is well known in the art that a distributed architecture in which more than one computer system performs each function is entirely equivalent.

In one advantageous embodiment of the invention, system 300 represents a portion of a processor-based computer system. System 300 includes a processor 302, an input/output (I/O) adapter 304, an operator interface 306, a memory 310 and a disk storage 318. Memory 310 stores computer program instructions and data. Processor 302 executes the program instructions, and processes the data, stored in memory 310. Disk storage 318 stores data to be transferred to and from memory 310. I/O adapter 304 communicates with other devices and transfers data in and out of the computer system over connection 324. Operator interface 306 interfaces with a system operator by accepting commands and providing status information. All these elements are interconnected by bus 308, which allows data to be intercommunicated between the elements. I/O adapter 304 represents one or more I/O adapters or network interfaces that can connect to local or wide area networks such as, for example, the network described in FIGS. 1 and 2. Therefore, connection 324 represents a network or a direct connection to other equipment.

Processor 302 can be any type of processor capable of providing the speed and functionality required by the embodiments of the invention. For example, processor 302 could be a processor from the Pentium® family of processors made by Intel Corporation, or the processors made by Motorola.

For purposes of this application, memory 310 and disk 318 are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 300 may contain various combinations of machine readable storage devices through other I/O controllers, which are accessible by processor 302 and which are capable of storing a combination of computer program instructions and data.

Memory 310 is accessible by processor 302 over bus 308 and includes an operating system 316, a program partition 312 and a data partition 314. Program partition 312 stores and allows execution by processor 302 of program instructions that implement the functions of each respective system described herein. Data partition 314 is accessible by processor 302 and stores data used during the execution of program instructions. In system 300, program partition 312 contains program instructions that implement the multicast testing protocol described herein. This includes operating as a data sender, data receiver, and as a data coordinator. As used herein, each set of program instructions contained in program partition 312 to perform a particular set of functions is referred to as a "module" in general. Although in this embodiment of the invention the modules are implemented in software, it can be appreciated that the functions performed by any particular module can be implemented in hardware, software or a combination of both using well-known signal processing techniques. It should also be appreciated that although any system 300 located at any of network nodes 102 is capable of operating as a data sender, data receiver or a data coordinator, each system 300 typically performs only one such function at any particular time.

The operation of systems 100, 200 and 300 will be described in more detail with reference to FIGS. 4–8. Although FIGS. 4–8 presented herein include a particular sequence of steps, it can be appreciated that the sequence of steps merely provides an example of how the general functionality described herein can be implemented. Further, each sequence of steps does not have to be executed in the order presented unless otherwise indicated.

Figure 4:
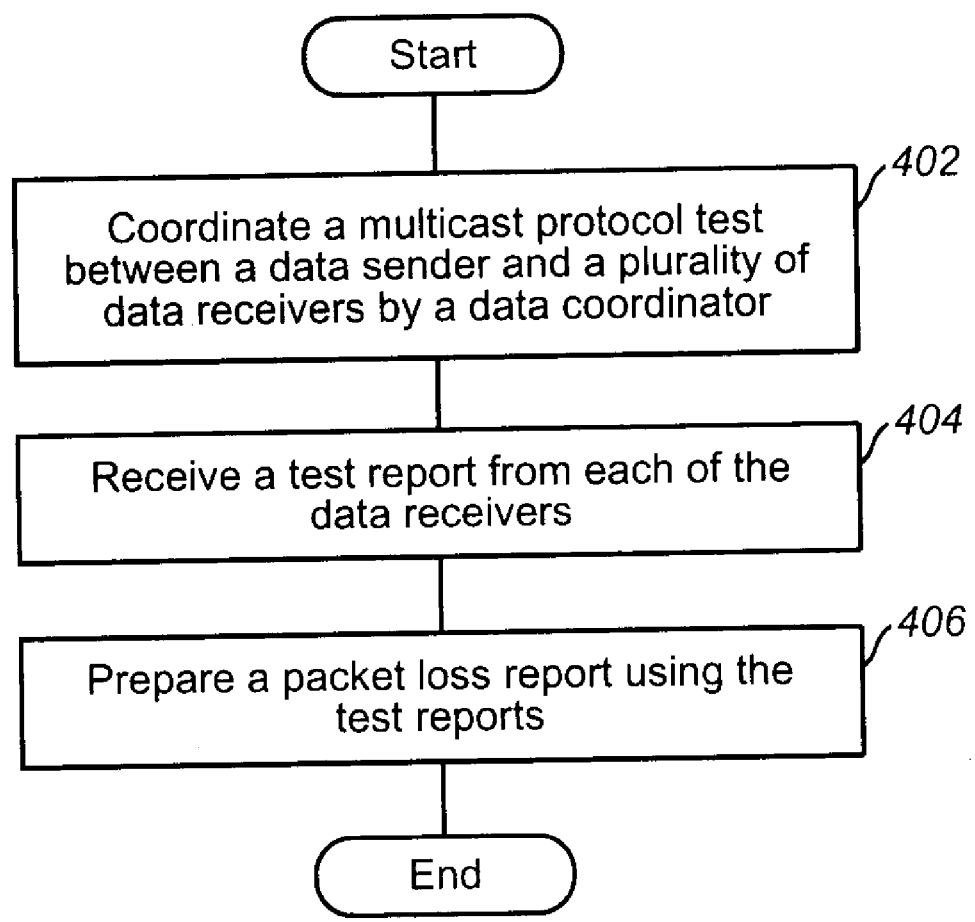
FIG. 4 is a block flow diagram of the operations performed by a data coordinator module in accordance with one embodiment of the invention.

FIG. 4 is a block flow diagram of the operations performed by a data coordinator module in accordance with one embodiment of the invention. The term "data coordinator module" refers to the software and/or hardware used to implement the functionality for coordinating the multicast testing protocol as described herein. In this embodiment of the invention, the data coordinator functionality is performed by a workstation 222 configured with the data coordinator module. It can be appreciated that this functionality, however, can be implemented by any device, or combination of devices, located anywhere in a communication network and still fall within the scope of the invention.

FIG. 4 illustrates a block flow diagram of the operations of a data coordinator module to measure multicast performance over a network in accordance with one embodiment of the invention. FIG. 4 illustrates a process 400. As shown in FIG. 4, a multicast test is coordinated between a data sender and a plurality of data receivers by a data coordinator at step 402. A test report is received from each of the data receivers at step 404. A packet loss report is prepared using the test reports at step 406.

A multicast test is coordinated between a data sender and a plurality of data receivers by a data coordinator at step 402. A data sender and a plurality of data receivers are first selected. The data receivers are prepared to receive test packets from the data sender. In one embodiment of the invention, the data receivers are prepared by sending a first control message to the data receivers using an out of band protocol, with the first control message including a number of test packets, a multicast group and a data rate. An example of the out of band protocol is a unicast protocol, such as TCP/IP. Once the data receivers are prepared, the data sender is initiated to send test packets to the data receivers over the network. The data sender is initiated by sending a second control message to the data sender using the out of band protocol (e.g., TCP/IP), with the second control message including the same number of test packets, the multicast group and the data rate, as the first control message.

Figure 5A:
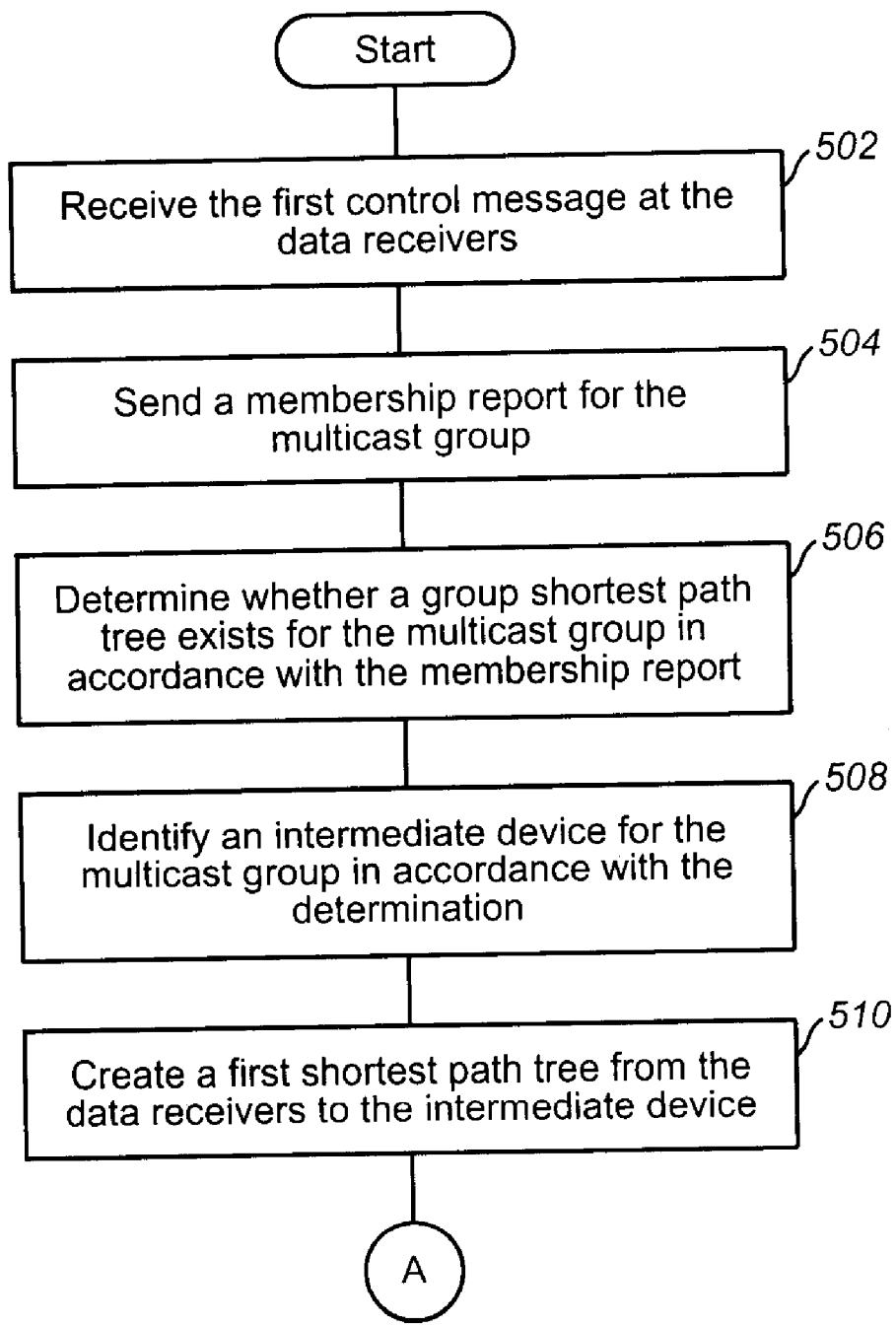
FIG. 5A is a first block flow diagram of the operations performed by a data receiver module in accordance with one embodiment of the invention.

FIG. 5A is a first block flow diagram of the operations performed by a data receiver module in accordance with one embodiment of the invention. FIG. 5 illustrates a process 500 performed by a data receiver. The data receiver receives the first control message at step 502. Once the data receivers receive the first control message, they begin to prepare to receive the test packets. A membership report for the multicast group is sent to the local router for a particular data receiver at step 504. An example of a membership report is an Internet Group Membership Protocol (IGMP) version two membership report. A determination is made as to whether a group shortest path tree exists for the multicast group in accordance with the membership report at step 506. If there is no group shortest path tree existing, a group shortest path tree is created for the multicast group by first identifying an intermediate device for the multicast group at step 508. A first shortest path tree is created from the data receivers to the intermediate device at step 510. For example, the first shortest path tree can be created using PIM join messages.

Figure 5B:
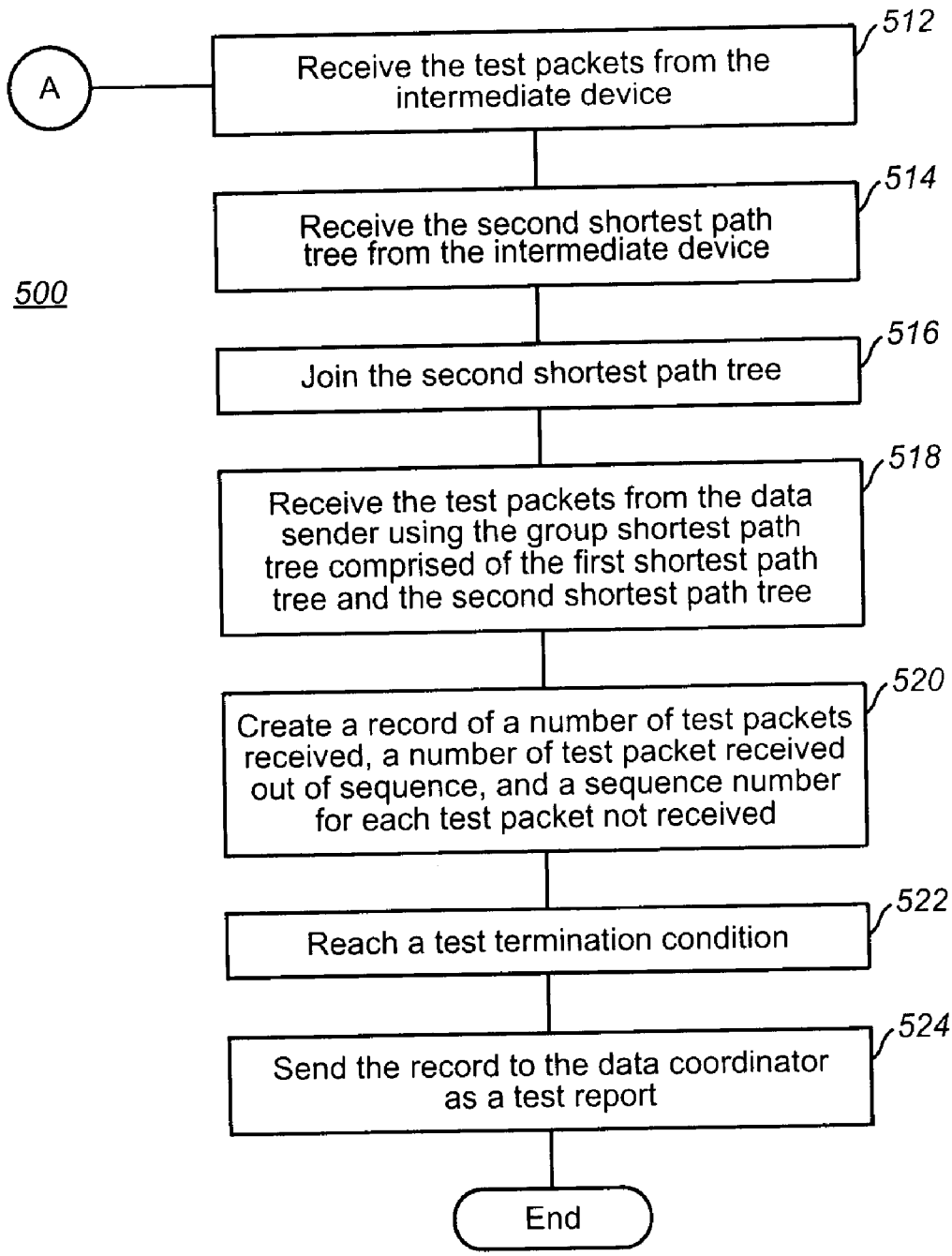
FIG. 5B is a second block flow diagram of the operations performed by a data receiver module in accordance with one embodiment of the invention.

FIG. 5B is a second block flow diagram of the operations performed by a data receiver module in accordance with one embodiment of the invention. As shown in FIG. 5B, once the multicast protocol test begins, each data receiver begins receiving the test packets from the intermediate device at step 512. The data receivers also receive a second shortest path tree from the intermediate device at step 514. The second shortest path tree is the shortest path tree between the intermediate device and the data sender. The data receivers then join the second shortest path tree at step 516, and begin receiving the test packets from the data sender using a group shortest path tree comprised of the first shortest path tree and the second shortest path tree at step 518.

In one embodiment of the invention, each test packet has a sequence number. The data receivers create a record of a number of test packets received, a number of test packet received out of sequence, and a sequence number for each test packet not received, at step 520. The data receivers reach a test termination condition at step 522. An example of a test termination condition includes a time-out condition, receipt of final packet sequence number or end test control message. Once the test is terminated, each data receiver sends the record to the data coordinator as a test report at step 524. Process 500 then terminates.

Figure 6:
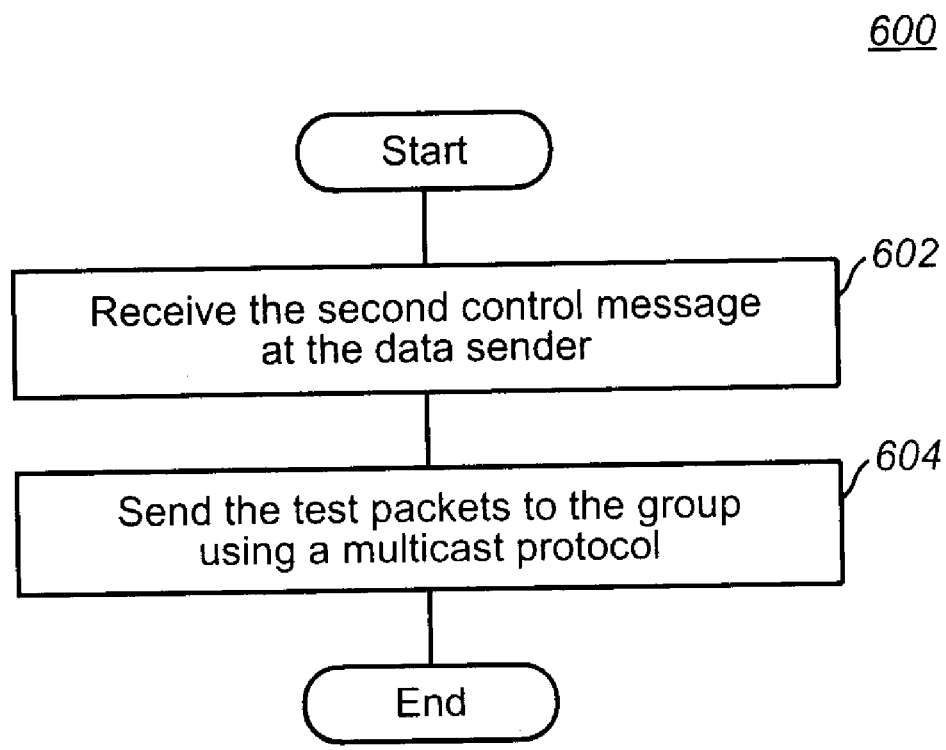
FIG. 6 is a block flow diagram of the operations performed by a data sender module in accordance with one embodiment of the invention.

FIG. 6 is a block flow diagram of the operations performed by a data sender module in accordance with one embodiment of the invention. FIG. 6 illustrates a process 600. The data sender receives the second control message at step 602. The data sender sends the test packets to the multicast group (i.e., data receivers) using a multicast protocol (e.g., the IP multicast protocol) at step 604. The process 600 is then terminated.

Figure 7:
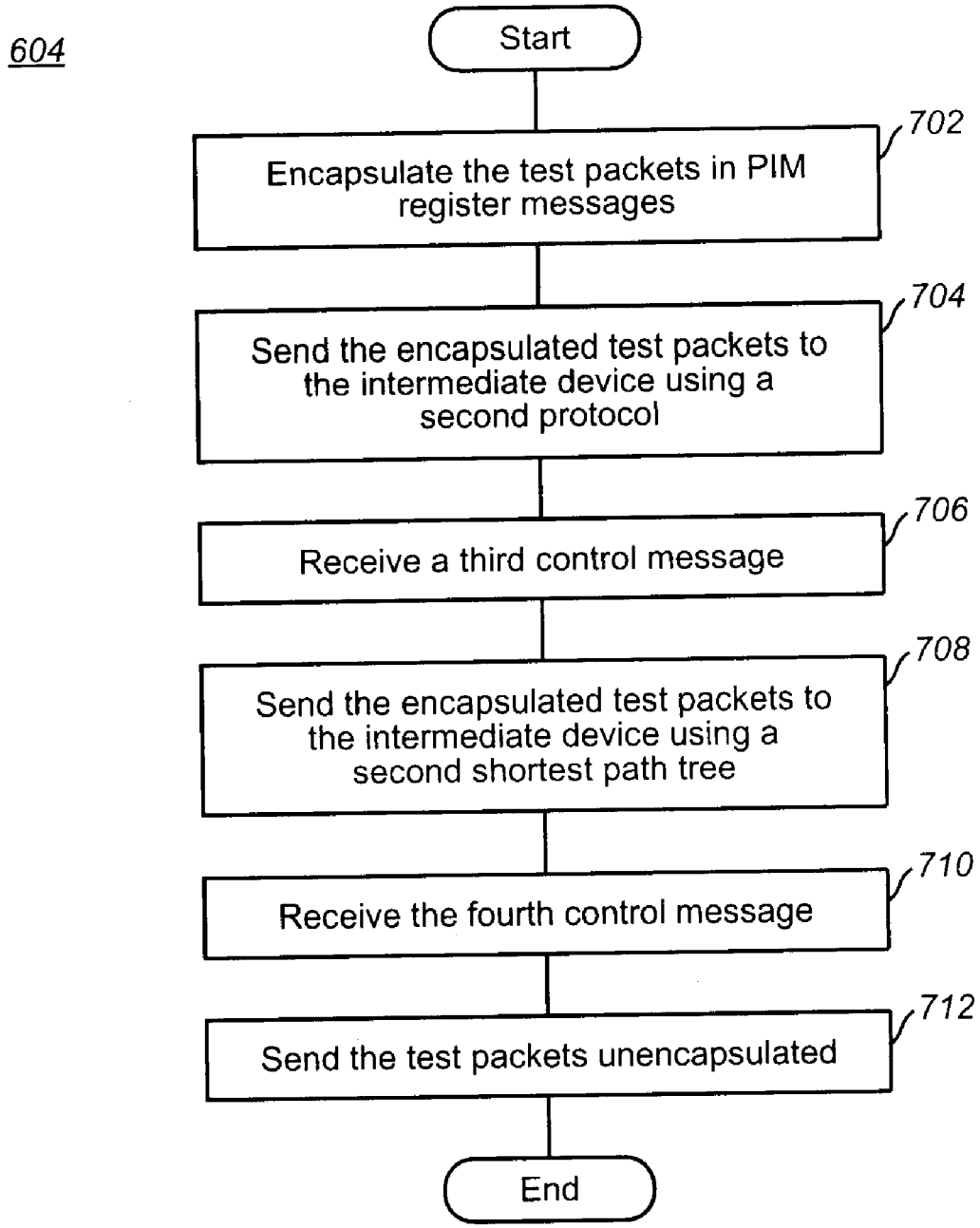
FIG. 7 is a block flow diagram of the operations performed by a data sender module to send the test packets in accordance with one embodiment of the invention.

FIG. 7 is a block flow diagram of the operations performed by a data sender module to send the test packets in accordance with one embodiment of the invention. FIG. 7 is one example of the steps performed for sending the test packets to the multicast group using the IP multicast protocol (step 604). As shown in FIG. 7, the data sender encapsulates the test packets in PIM register messages at step 702. The data sender sends the encapsulated test packets to the intermediate device using a second protocol, such as a unicast protocol (e.g., TCP/IP) at step 704. The data sender receives a third control message from the intermediate device at step 706. The data sender begins sending the encapsulated test packets to the intermediate device using the second shortest path tree in accordance with the third control message at step 708. The data sender receives a fourth control message from the intermediate device at step 710. The data sender stops encapsulating the test packets and sends the unencapsulated test packets at step 712.

Figure 8:
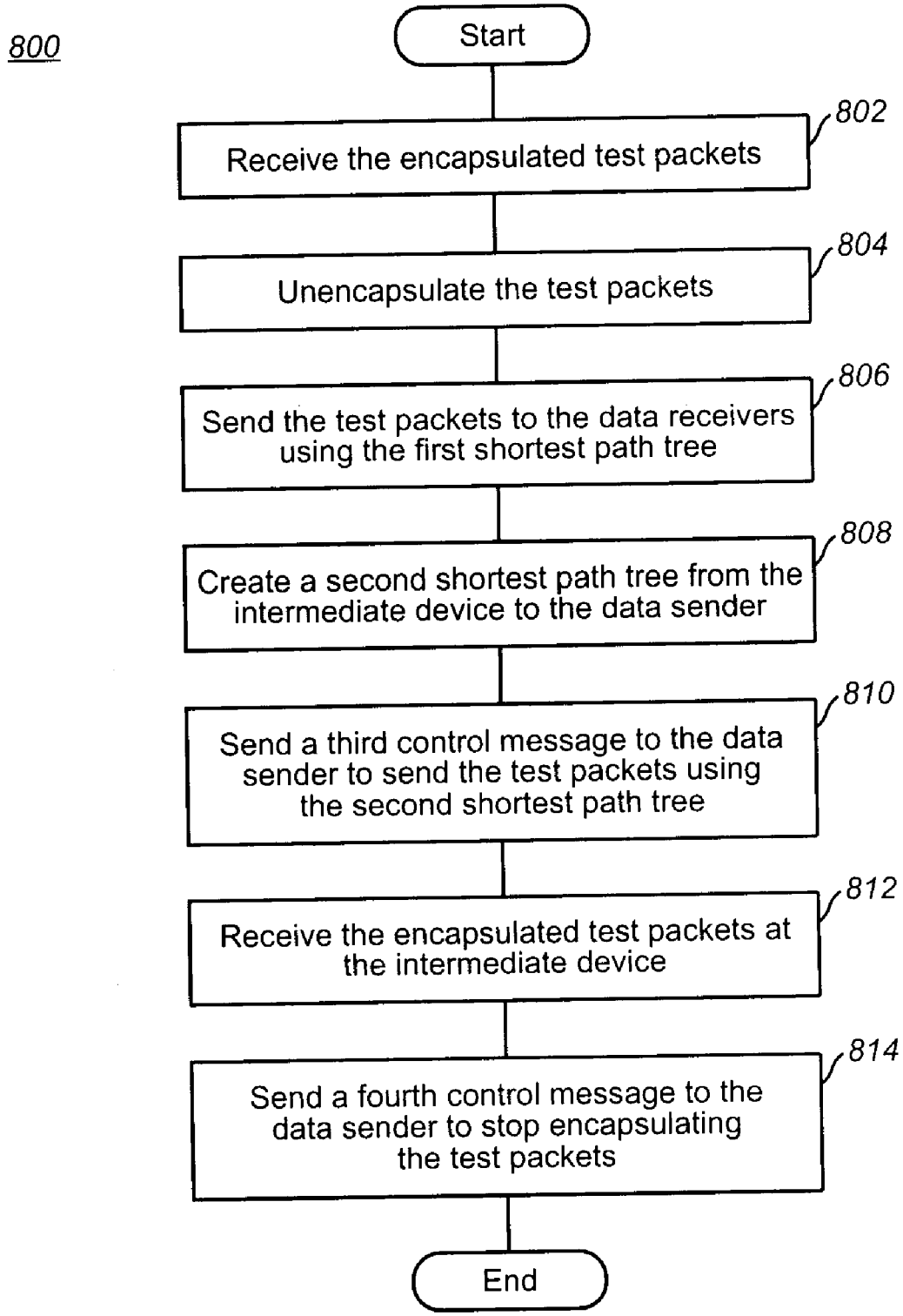
FIG. 8 is a block flow diagram of the operations performed by an intermediate device module in accordance with one embodiment of the invention.

FIG. 8 is a block flow diagram of the operations performed by an intermediate device module in accordance with one embodiment of the invention. FIG. 8 illustrates a process 800. The intermediate device receives the unencapsulated test packets at step 802. The intermediate device unencapsulates the test packets at step 804. The intermediate device sends the test packets to the data receivers using the first shortest path tree at step 806. The intermediate device creates the second shortest path tree from the intermediate device to the data sender at step 808. The intermediate device sends the third control message to the data sender to send the test packets using the second shortest path tree at step 810. The intermediate device receives the encapsulated test packets via the second shortest path tree at step 812. The intermediate device sends the fourth control message to the data sender to instruct the data sender to stop encapsulating the test packets at step 814.

The operation of systems 100, 200, 300 and the flow diagrams shown in FIGS. 4, 5A, 5B, and 6–8 can be better understood by way of example. By means of the multicast testing protocol described herein, the hosts (e.g., workstations 222) can be instructed to send or receive any number of datagrams to or from any multicast group. For example, the data coordinator will instruct a data sender to send 50000 multicast packets on group 224.245.3.9, UDP port 9999 and instruct all data receivers to expect to receive 50000 packets from group 224.245.3.9, UDP port 9999. Each test packet contains a unique sequence number signature. During a test, if a packet is received with a sequence number greater than the one the data receiver expected, the data receiver makes a note of the lost packets. A packet received with a sequence number lower than the data receiver's expected sequence number indicates that the packet was received out of sequence. The data receiver considers this to be loss, but also records it as an out-of-sequence packet.

Once a test is complete, the data coordinator receives a report from each data receiver indicating which packets were lost and which were out of sequence. The data coordinator then generates graphical plots of loss relative to sequence number. These plots illustrate the nature of the loss, whether it is constant, periodic, bursty, and widespread or confined to particular data receivers. Different loss patterns are indicative of various equipment and protocol behaviors. For instance, a particular packet that was lost by all data receivers likely indicates that the loss was close to the source.

Figure 9:
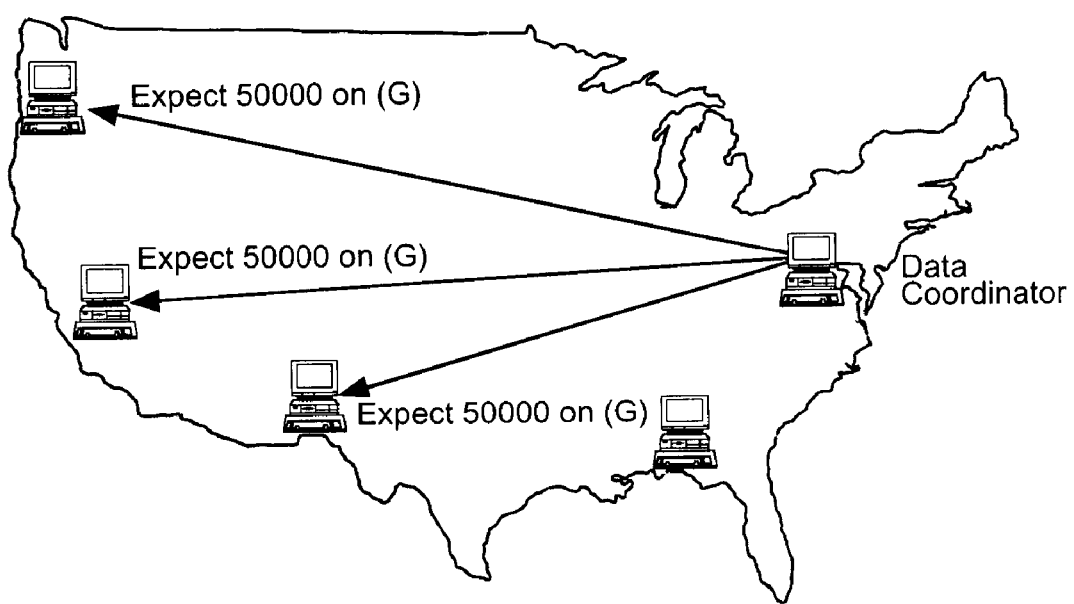
FIG. 9 provides an illustration of a first example of the operation of the multicast testing protocol in accordance with one embodiment of the invention.

FIG. 9 provides an illustration of a first example of the operation of the multicast testing protocol in accordance with one embodiment of the invention. A given test execution would operate as follows. One of the test hosts is selected as the data sender, while all other test hosts are deemed to be data receivers. A separate host performs as a data coordinator and sends a TCP control message to each of the data receivers instructing them to expect a particular number of packets on a specified multicast group at a particular data rate.

Figure 10:
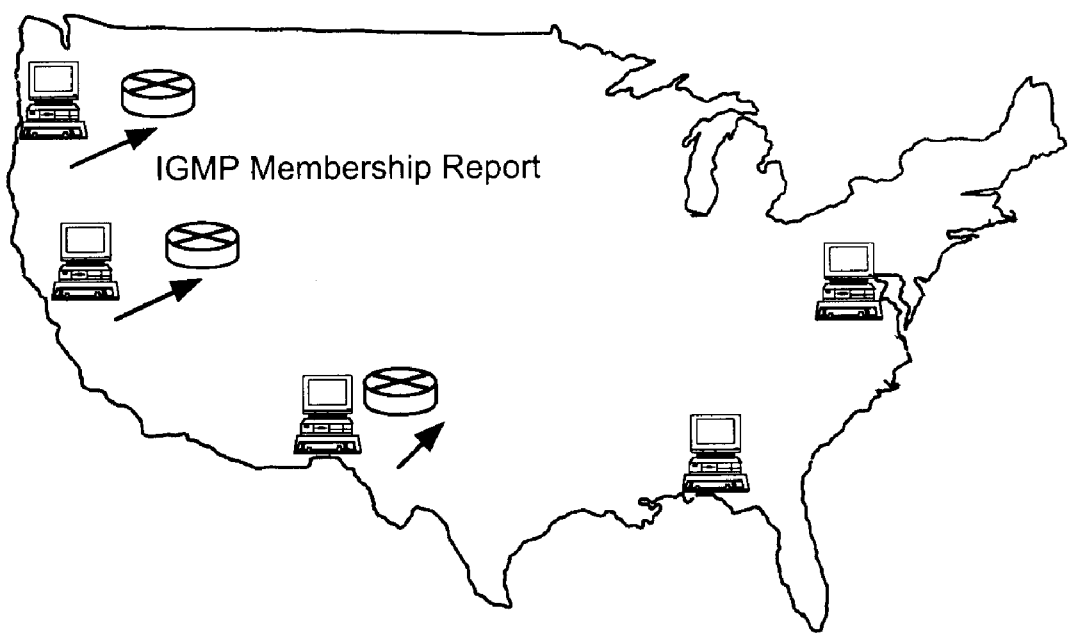
FIG. 10 provides an illustration of a second example of the operation of the multicast testing protocol in accordance with one embodiment of the invention.

FIG. 10 provides an illustration of a second example of the operation of the multicast testing protocol in accordance with one embodiment of the invention. As shown in FIG. 10, each of the data receivers sends an IGMP version 2 membership report for the multicast group. The directly-attached router for each data receiver will examine the membership report and determine if there is existing state for the group.

If not, the router determines the rendezvous point (e.g., IP address for an intermediate device) for the group and builds a first shortest path tree (SPT) toward the rendezvous point via PIM join messages.

Figure 11:
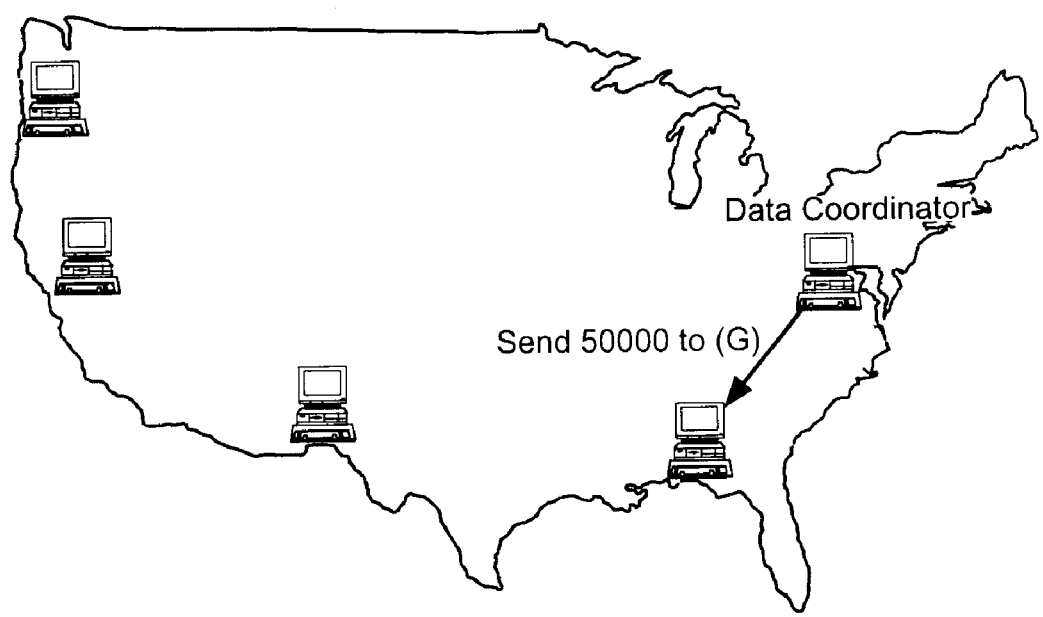
FIG. 11 provides an illustration of a third example of the operation of the multicast testing protocol in accordance with one embodiment of the invention.

FIG. 11 provides an illustration of a third example of the operation of the multicast testing protocol in accordance with one embodiment of the invention. As shown in FIG. 11, the data coordinator sends a control message to the data sender instructing it to send a designated number of packets to the specified multicast group at a particular rate. When the data sender begins sending, the directly attached router will encapsulate the initial packets in PIM register messages, which are then unicast to the rendezvous point for that multicast group. The rendezvous point unencapsulates the packets and sends them down the first SPT. The rendezvous point also builds a second SPT to the sender in order to receive the multicast traffic natively. Once the rendezvous point receives the multicast traffic from the sender natively, it sends PIM register stop messages to signal the data sender's directly-attached router to stop encapsulating the traffic. When the data receivers receive the test traffic via the shared tree, they initiate PIM join messages to join the second SPT to the data sender. This is known as the SPT switch-over.

multicast test traffic is likely to stay within the vBNS backbone.

To independently validate the results generated by the multicast testing programs, OC12MONs are used to verify consistent packet count, size and rate for both senders and data receivers. During a given test, the OC12MON observed the same number of packets sent from the data sender as the data coordinator had instructed it to send. Another OC12MON detected the same number of packets received as the data receiver reported receiving.

In addition, the performance and reliability of the test software can be verified by instructing the test software to send unicast packets rather than multicast. Because the packets are individually created with calls to the Sun ATM API, the ATM NIC has no knowledge of the type of packet, be it unicast or multicast, that it is sending. Using this technique, two Suns averaged 0.066% loss sending 1,000,000 packets at 400Mbps.

As discussed, the loss various data receivers experience is calculated after the test for a particular data sender completes. Once all tests are complete, a percentage loss matrix of all data receivers for each data sender is generated. An example is shown in Table 1.

TABLE 1

| | Receiver | | | | | | | | | | |
|---|---|---|---|---|---|---|---|---|---|---|---|
| SRC | AST | DNG | DNJ | HAY | HSJ | NOR | PYM | RTO | SEJ | WAE | WOR |
| ast | — | 2.034 | 2.096 | 2.064 | 2.343 | 2.034 | 2.220 | 2.296 | 2.064 | 1.958 | 2.118 |
| dng | 1.260 | 0.000 | 0.294 | 0.356 | 0.270 | 1.220 | 2.502 | 0.372 | 0.320 | 1.220 | 1.334 |
| dnj | 1.048 | 0.450 | 0.000 | 0.184 | 0.672 | 0.312 | 0.358 | 1.076 | 0.182 | 1.034 | 0.498 |
| hay | 0.584 | 1.092 | 0.934 | 0.000 | 0.978 | 0.398 | 0.570 | 1.322 | 1.830 | 0.384 | 1.004 |
| hsj | 0.286 | 100.000 | 0.232 | 0.153 | 0.000 | 0.262 | 0.332 | 0.424 | 100.000 | 0.140 | 0.320 |
| nor | 2.052 | 0.102 | 0.164 | 0.234 | 0.410 | 0.000 | 0.344 | 0.638 | 0.316 | 1.934 | 0.104 |
| pym | 1.150 | 0.566 | 0.698 | 0.952 | 0.726 | 0.556 | 0.000 | 1.114 | 0.730 | 1.122 | 0.590 |
| rto | 0.166 | 0.655 | 0.113 | 0.732 | 0.723 | 0.180 | 0.798 | 0.000 | 100.000 | 0.126 | 0.486 |
| sej | 0.242 | 0.532 | 0.532 | 0.728 | 0.588 | 0.140 | 0.188 | 0.898 | 0.000 | 0.536 | 0.476 |
| wae | 0.222 | 0.192 | 0.254 | 0.390 | 0.556 | 0.166 | 0.224 | 0.928 | 0.944 | 0.000 | 0.378 |
| wor | 0.590 | 0.302 | 0.430 | 0.494 | 1.118 | 0.302 | 0.434 | 1.240 | 0.492 | 0.114 | 0.000 |

Figure 12:
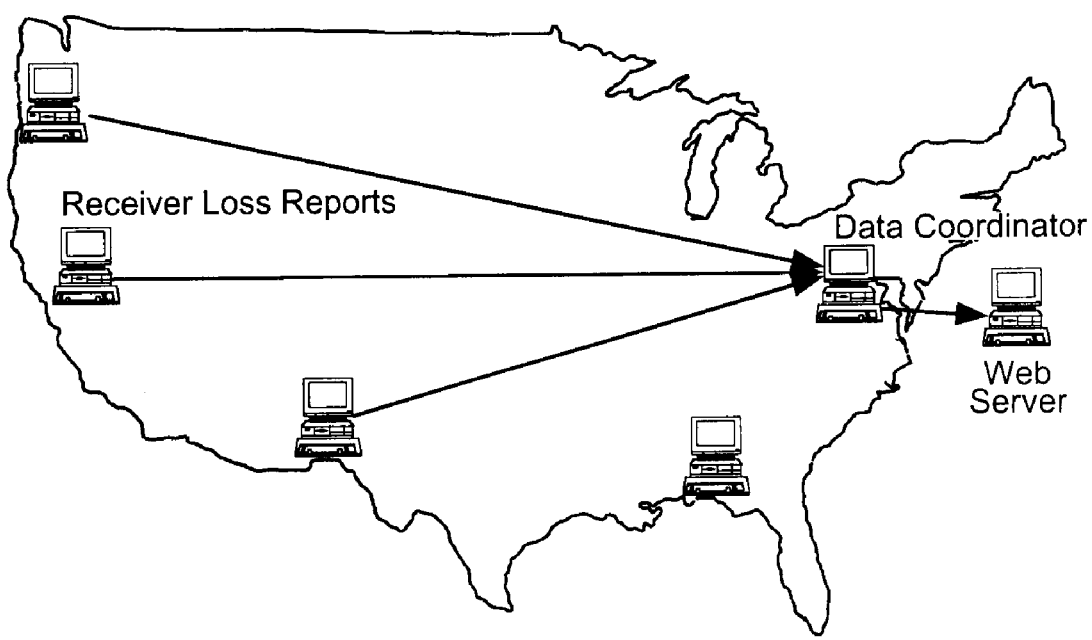
FIG. 12 provides an illustration of a fourth example of the operation of the multicast testing protocol in accordance with one embodiment of the invention.

FIG. 12 provides an illustration of a fourth example of the operation of the multicast testing protocol in accordance with one embodiment of the invention. While the test is in operation, each data receiver writes to local disk a file containing information on which packets were lost. When the test completes, the coordinating host copies this packet-loss information from each data receiver where it is processed with shell scripts and a graphing program (e.g., "gnuplot") to generate packet-loss graphs. All of the loss information is archived by date and then the graphs and other generated HTML is copied to the vBNS web server.

Figure 13:
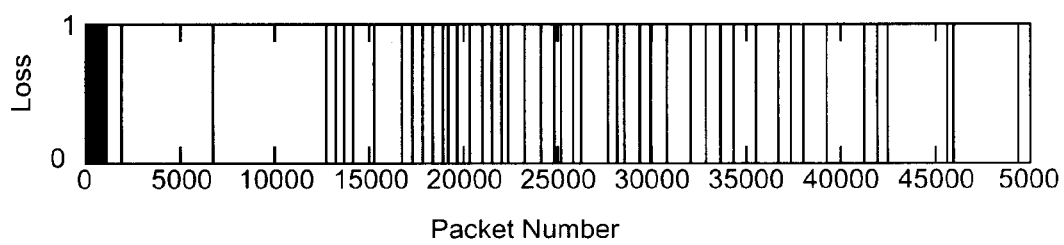
FIG. 13 is a first graphical plot of loss relative to sequence number in accordance with one embodiment of the invention.

The multicast addresses used in the multicast protocol tests are within the 224.0.145.0/24 range. This range complies with the experimental multicast address allocation scheme called "GLOP addressing" as specified by the Internet Engineering Task Force (IETF). The vBNS border routers are configured with multicast boundaries preventing this range from entering or exiting external multicast connections. MSDP peering is similarly configured to prevent MSDP SA messages for this group address range. Thus, all FIG. 13 is a first graphical plot of loss relative to sequence number in accordance with one embodiment of the invention. In addition to the absolute percentage loss numbers illustrated in Table 1, graphical plots of loss relative to sequence number are generated for every data receiver during a test. For example, FIG. 13 depicts the periodic loss that a particular node (DNG) experienced during a test where node AST was the sender. This particular test incurred 1017 packets lost out of 50000 sent (2.034% loss).

Figure 14:
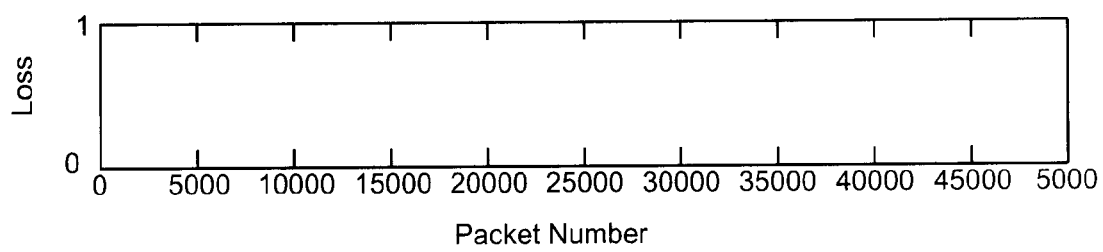
FIG. 14 is a second graphical plot of loss relative to sequence number in accordance with one embodiment of the invention.

FIG. 14 is a second graphical plot in accordance with one embodiment of the invention. In contrast to the results shown in FIG. 13, FIG. 14 shows loss that DNG experienced during a test where node PYM was the sender. In this test, 283 packets of 50000 were lost (0.566%) with no evident loss pattern.

The loss matrix results of 63 complete tests run in a single month were averaged after discarding erroneous entries. Erroneous entries appear as a 100% loss and are typically the result of the router or network dropping the IGMP membership report The resulting average percentage loss matrix is given as an example in Table 2.

TABLE 2

| | Receiver | | | | | | | | | |
|---|---|---|---|---|---|---|---|---|---|---|
| SRC | AST | DNG | DNJ | HAY | HSJ | NOR | PYM | RTO | SEJ | WAE | WOR |
| ast | 0.000 | 1.293 | 1.302 | 1.382 | 1.472 | 1.301 | 1.450 | 1.681 | 1.471 | 1.239 | 1.398 |
| dng | 1.005 | 0.000 | 0.385 | 0.693 | 0.541 | 0.443 | 0.632 | 0.803 | 0.685 | 0.918 | 0.586 |
| dnj | 1.280 | 1.064 | 0.000 | 0.684 | 1.159 | 0.635 | 0.738 | 1.344 | 0.599 | 1.142 | 0.794 |
| hay | 0.576 | 1.299 | 1.100 | 0.000 | 1.362 | 0.496 | 0.627 | 1.418 | 1.336 | 1.183 | 0.575 |
| hsj | 0.272 | 0.601 | 0.611 | 1.054 | 0.000 | 0.289 | 0.453 | 0.288 | 1.377 | 0.190 | 0.454 |
| nor | 1.230 | 0.481 | 0.674 | 0.913 | 0.733 | 0.000 | 0.326 | 0.884 | 0.883 | 1.168 | 0.415 |
| pym | 1.559 | 0.626 | 0.894 | 1.010 | 0.913 | 0.527 | 0.000 | 1.041 | 0.961 | 1.485 | 0.636 |
| rto | 0.374 | 0.594 | 0.658 | 0.738 | 0.775 | 0.277 | 0.442 | 0.000 | 0.833 | 0.186 | 0.459 |
| sej | 0.376 | 1.319 | 1.231 | 1.303 | 1.332 | 0.301 | 0.428 | 1.439 | 0.000 | 1.002 | 0.446 |
| wae | 0.466 | 0.689 | 0.936 | 1.077 | 0.978 | 0.479 | 0.545 | 1.159 | 1.012 | 0.000 | 0.652 |
| wor | 1.375 | 0.707 | 0.889 | 1.034 | 0.957 | 0.553 | 0.557 | 1.117 | 0.973 | 1.303 | 0.000 |

For the purposes of this example of multicast performance tests, the multicast topology is congruent with the unicast topology. Table 3 shows the number of unicast IP hops from each sender to every data receiver.

TABLE 3

| | Receiver | | | | | | | | | |
|---|---|---|---|---|---|---|---|---|---|---|
| SRC | AST | DNG | DNJ | HAY | HSJ | NOR | PYM | RTO | SEJ | WAE | WOR |
| ast | 0 | 3 | 4 | 4 | 2 | 2 | 2 | 3 | 5 | 1 | 2 |
| dng | 3 | 0 | 1 | 2 | 2 | 1 | 2 | 3 | 2 | 2 | 2 |
| dnj | 4 | 1 | 0 | 1 | 3 | 2 | 3 | 2 | 1 | 3 | 3 |
| hay | 4 | 2 | 1 | 0 | 2 | 3 | 4 | 1 | 1 | 4 | 4 |
| hsj | 2 | 2 | 3 | 2 | 0 | 3 | 4 | 1 | 3 | 4 | 4 |
| nor | 2 | 1 | 2 | 3 | 3 | 0 | 1 | 4 | 3 | 1 | 1 |
| pym | 2 | 2 | 3 | 4 | 4 | 1 | 0 | 5 | 4 | 1 | 1 |
| rto | 3 | 3 | 2 | 1 | 1 | 4 | 5 | 0 | 2 | 5 | 5 |
| sej | 5 | 2 | 1 | 1 | 3 | 3 | 4 | 2 | 0 | 4 | 4 |
| wae | 1 | 2 | 3 | 4 | 4 | 1 | 1 | 5 | 4 | 0 | 1 |
| wor | 2 | 2 | 3 | 4 | 4 | 1 | 1 | 5 | 4 | 1 | 0 |

Figure 15:
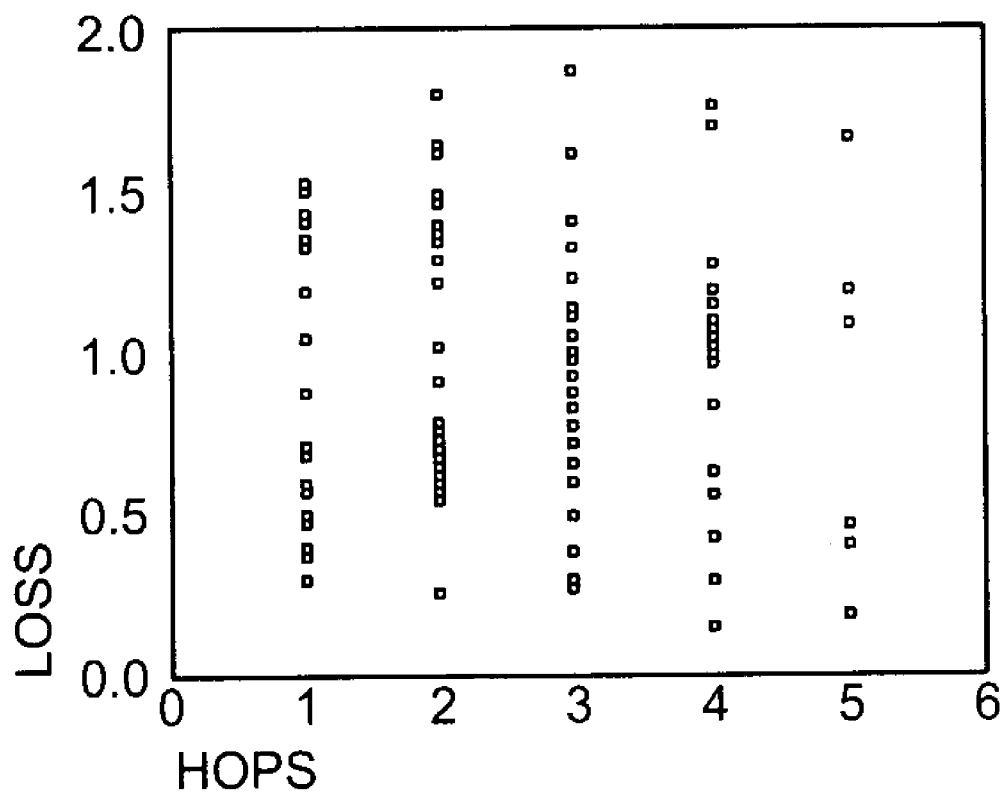
FIG. 15 is a scatter plot showing the distribution of the loss averages as relative to hop count in accordance with one embodiment of the invention.

FIG. 15 is a scatter plot showing the distribution of the loss averages as relative to hop count in accordance with one embodiment of the invention.

Figure 16:
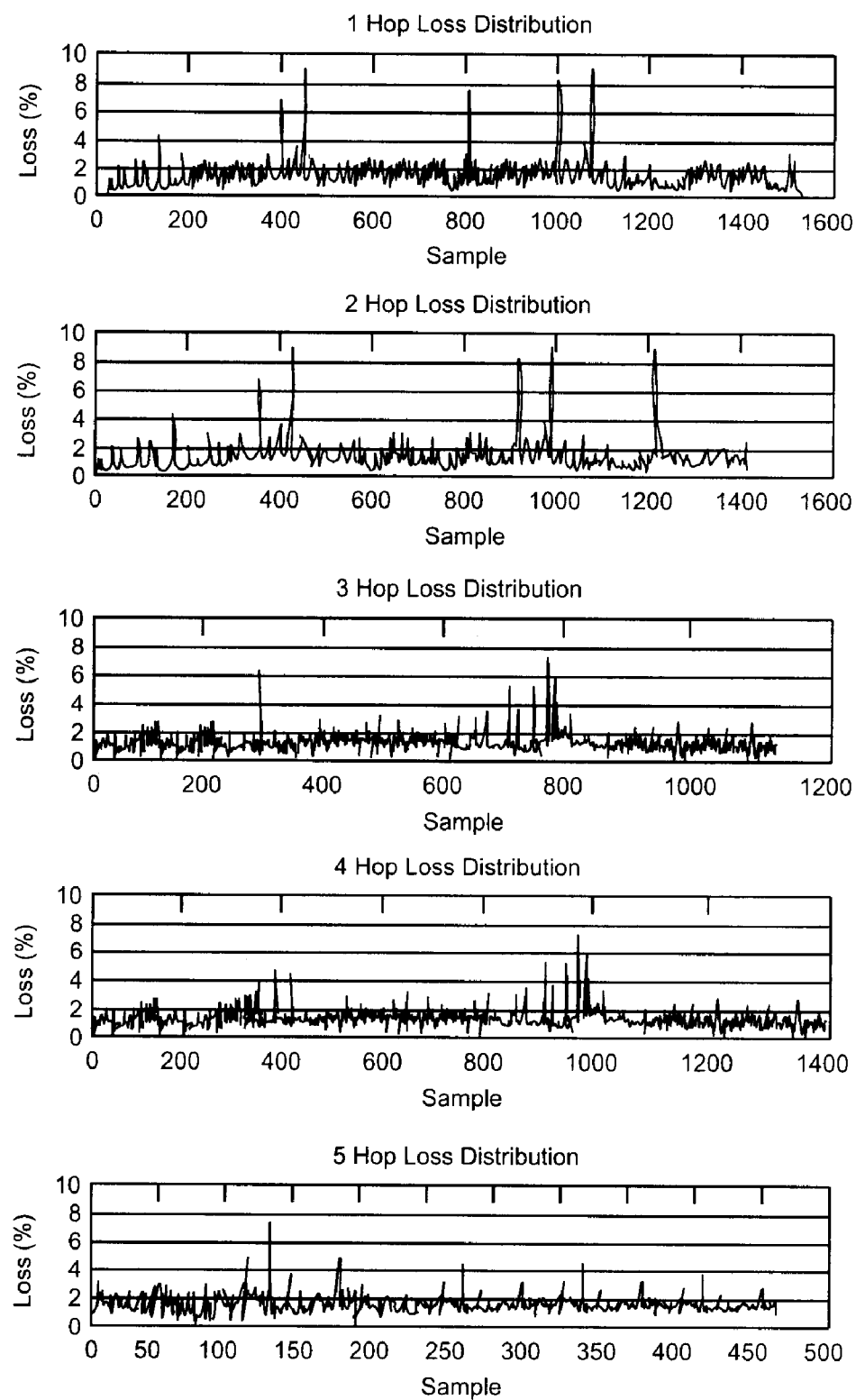
FIG. 16 is five graphical plots to illustrate the absolute loss distribution relative to router hop count in accordance with one embodiment of the invention.

FIG. 16 depicts five graphical plots to illustrate the absolute loss distribution relative to router hop count in accordance with one embodiment of the invention. Each sample for the 63 complete test runs was divided according to the number of unicast IP hops, from 1 to 5. This produced 1537 1 hop, 1430 2 hop, 1094 3 hop, 1386 4 hop and 479 5 hop loss statistics. Each of these is plotted in FIG. 16 to illustrate the absolute loss distribution relative to router hop count.

Figure 17:
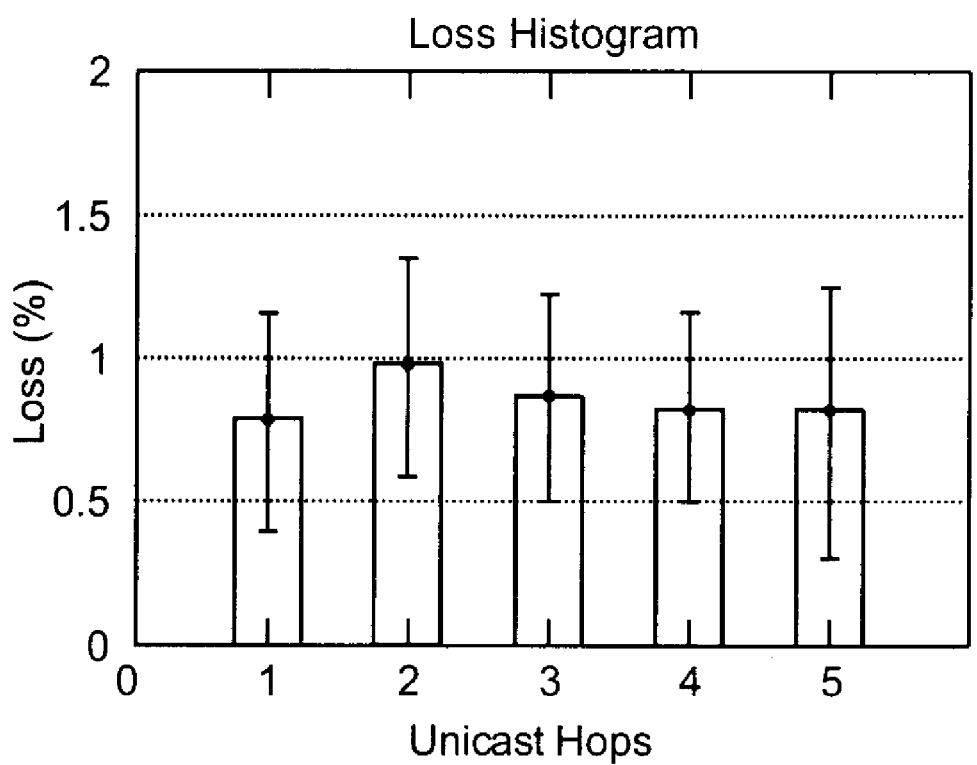
FIG. 17 is a loss histogram illustrating the average and standard deviation for each number of hops in accordance with one embodiment of the invention.

The average and standard deviation for each number of hops are presented in a multicast loss histogram relative to hop distance as shown in Table 4 and graphically in FIG. 17.

TABLE 4

| Hops | Loss Average | Standard Deviation |
|---|---|---|
| 1 | 0.7927 | 0.3817 |
| 2 | 0.9769 | 0.3808 |
| 3 | 0.8744 | 0.3603 |
| 4 | 0.8323 | 0.3373 |
| 5 | 0.7814 | 0.4685 |

As shown from above, the mean loss is 0.9081% and Pearson's correlation coefficient between the unicast hop count and the loss is 0.002, which indicates that the two data sets do not exhibit a linear relationship to each other. Therefore, these results indicate that there is no definite relationship between multicast loss in the network and the number of router hops.

Additional multicast loss information available using the multicast testing protocol described herein on the vBNS includes testing loss as a function of multicast packet size and loss as a function of data rate. Using these additional measures, the step-wise linear regression reveals a stronger correlation than that found in the examples given above.

Both the multicast protocol testing protocol and equipment described herein is capable of having sufficient capacity to handle multi-hundred-megabit-per-second multicast flows across the vBNS backbone. To reach the gigabit per second multicast data rate, specialized hardware such as the Netcom Systems Smartbits test equipment or the playback capabilities of an OC48MON, the OC-48 version of the OCxMON, can be added.

Although various embodiments are specifically illustrated and described herein, it will be appreciated that modifications and variations of the present invention are covered by the above teachings and within the purview of the appended claims without departing from the spirit and intended scope of the invention. For example, although the embodiments of the invention implement the functionality of the processes described herein in software, it can be appreciated that the functionality of these processes may be implemented in hardware, software, or a combination of hardware and software, using well-known signal processing techniques. In another example, the embodiments were described using a communication network. A communication network, however, can utilize an infinite number of network devices configured in an infinite number of ways. The communication network described herein is merely used by way of example, and is not meant to limit the scope of the invention.

It is claimed:

1. A method to measure multicast performance over a network, comprising:

creating a first shortest path tree from a plurality of data receivers to an intermediate device identified to support multicast data transmission;

creating a second shortest path tree from said intermediate device to a data sender configured to send test packets;

forming a group shortest path tree including the first shortest path tree and the second shortest path tree to support transmission of the test packets from said data sender to said data receivers generating test reports at said data receivers based on the received test packets; and receiving the test reports, and generating a packet loss report based thereon, at a data coordinator.

2. The method of claim 1, further comprising:

selecting said data sender and said plurality of data receivers;

preparing said data receivers to receive said test packets from said data sender; and initiating said data sender to send said test packets to said data receivers.

3. The method of claim 2, further comprising:

sending a first control message to said data receivers using an out of band protocol, with said first control message specifying a number of test packets, a multicast group and a data rate.

4. The method of claim 3, wherein said out of band protocol is a transport control protocol/internet protocol.

5. The method of claim 1, wherein membership information corresponding to said data receivers includes a membership report according to an Internet Group Management Protocol (IGMP).

6. The method of claim 1, wherein said first shortest path tree is created using Protocol Independent Multicast (PFM) join messages.

7. The method of claim 3, further comprising:

sending a second control message to said data sender using an out of band protocol, said second control message specifying a number of test packets, a multicast group and a data rate.

8. The method of claim 7, wherein said out of band protocol is a transport control protocol/internet protocol.

9. The method of claim 7, wherein said data sender encapsulates said test packets in Protocol Independent Multicast (PIM) register messages, and sends said encapsulated test packets to said intermediate device.

10. The method of claim 9, wherein said encapsulated test packets are sent to said intermediate device according to a unicast protocol.

11. The method of claim 9, wherein said intermediate device unencapsulates said test packets and sends said test packets to said data receivers using said first shortest path tree, the method further comprising:

sending a third control message to said data sender to send said test packets using said second shortest path tree.

12. The method of claim 11, wherein said data sender sends said encapsulated test packets to said intermediate device using said second shortest path tree.

13. The method of claim 1, wherein each of said test packets has a sequence number.

14. The method of claim 13, wherein each of said data receivers creates a record of a number of test packets received, a number of test packet received out of sequence, and a sequence number for each test packet not received, wherein said record is included in a corresponding one of said test reports.

15. The method of claim 14, wherein said record is created based on a test termination condition that comprises at least one of a group comprising a time-out condition, receipt of final packet sequence number or end test control message.

16. A machine-readable medium whose contents cause a computer system to measure multicast performance over a network, the contents causing the computer system to perform the steps of:

creating a first shortest path tree from a plurality of data receivers to an intermediate device identified to support multicast data transmission;

creating a second shortest path tree from said intermediate device to a data sender configured to send test packets;

forming a group shortest path tree including the first shortest path tree and the second shortest path tree to support transmission of the test packets from said data sender to said data receivers generating test reports at said data receivers based on the received test packets; and receiving the test reports, and generating a packet loss report based thereon, at a data coordinator.

17. The machine-readable medium of claim 16, wherein the computer system further performs the steps of:

selecting said data sender and said plurality of data receivers;

preparing said data receivers to receive said test packets from said data sender;

and initiating said data sender to send said test packets to said data receivers.

18. The machine-readable medium of claim 17, wherein the computer system further performs the steps of:

sending a first control message to said data receivers using an out of band protocol, with said first control message specifying a number of test packets, a multicast group and a data rate.

19. The machine-readable medium of claim 18, wherein said out of band protocol is a transport control protocol/internet protocol.

20. The machine-readable medium of claim 16, wherein membership information corresponding to said data receivers includes a membership report according to an Internet Group Management Protocol (IGMP).

21. The machine-readable medium of claim 16, wherein said first shortest path tree is created using Protocol Independent Multicast (PIM) join messages.

22. The machine-readable medium of claim 18, wherein the computer system further performs the steps of:

sending a second control message to said data sender using an out of band protocol, said second control message specifying a number of test packets, a multicast group and a data rate.

23. The machine-readable medium of claim 22, wherein said out of band protocol is a transport control protocol/internet protocol.

24. The machine-readable medium of claim 22, wherein said data sender encapsulates said test packets in Protocol Independent Multicast (PIM) register messages, and sends said encapsulated test packets to said intermediate device.

25. The machine-readable medium of claim 24, wherein said encapsulated test packets are sent to said intermediate device according to a unicast protocol.

26. The machine-readable medium of claim 24, wherein said intermediate device unencapsulates said test packets and sends said test packets to said data receivers using said first shortest path tree, the computer system further performing the step of:

sending a third control message to said data sender to send said test packets using said second shortest path tree.

27. The machine-readable medium of claim 26, wherein said data sender sends said encapsulated test packets to said intermediate device using said second shortest path tree.

28. The machine-readable medium of claim 16, wherein each of said test packets has a sequence number.

29. The machine-readable medium of claim 28, wherein each of said data receivers creates a record of a number of test packets received, a number of test packet received out of sequence, and a sequence number for each test packet not received, wherein said record is included in a corresponding one of said test reports.

30. The machine-readable medium of claim 29, wherein said record is created based on a test termination condition that comprises at least one of a group comprising a time-out condition, receipt of final packet sequence number or end test control message.

31. A method for supporting performance measurement of a multicast network, comprising:

receiving a control message from a data coordinator to send test packets to a plurality of data receivers over the network according to a group shortest path tree, wherein the group shortest path tree is created by joining a plurality of shortest path trees associated with an intermediate device that is employed to support initial transmission of the test packets to the data receivers said plurality of shortest path trees including a first shortest path tree from said plurality of data receivers to said intermediated device, and a second shortest path tree from said intermediate device to a data sender configured to send said test packets; and directly transmitting the test packets to the data receivers after the creation of the group shortest path tree, wherein a performance report is prepared by the data coordinator based on test reports generated from the respective data receivers.

\* \* \* \* \*